Jan. 5, 1965
M. POWLEY ETAL
3,164,830
AIRCRAFT FLIGHT-CONTROL APPARATUS
Filed April 9, 1959
2 Sheets-Sheet 1
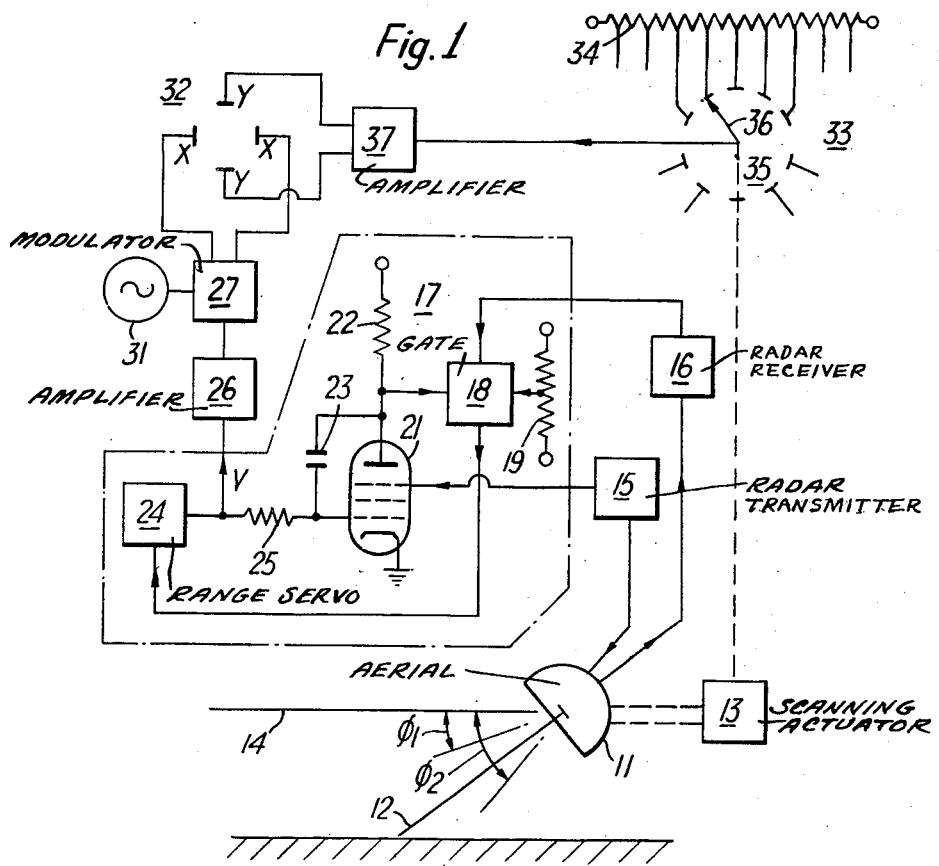
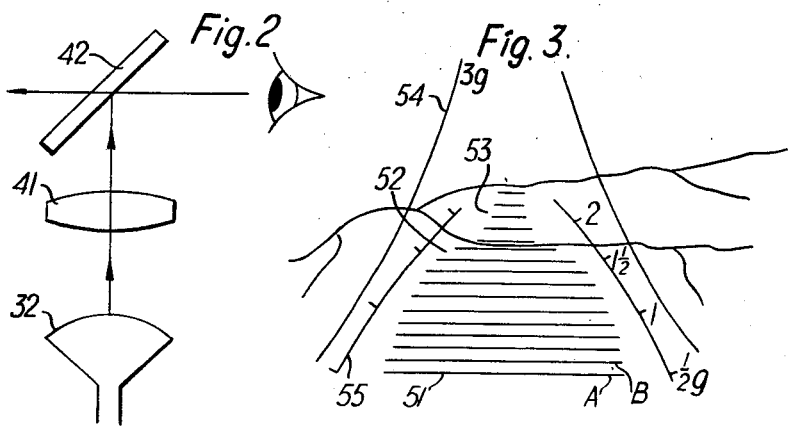

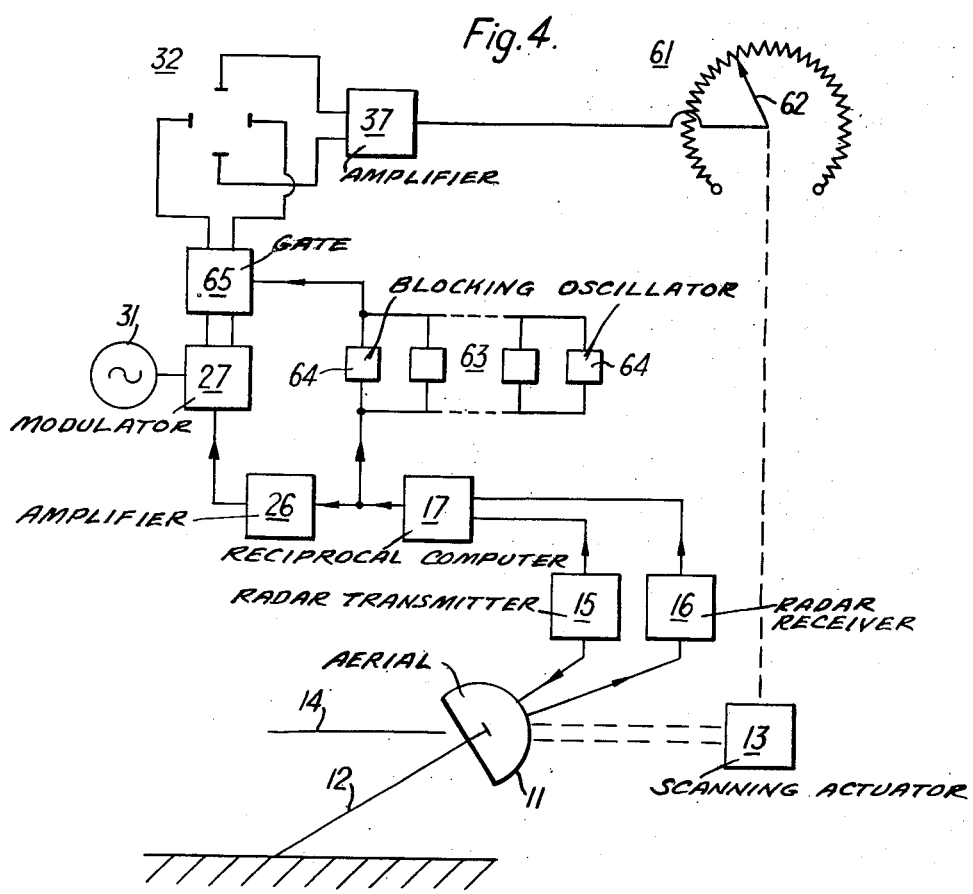
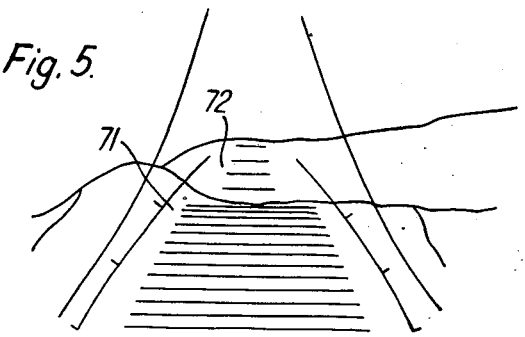

United States Patent Office 3,164,830
Patented Jan. 5, 1965

3,164,830
AIRCRAFT FLIGHT-CONTROL APPARATUS
Mallinson Powley, Edinburgh, James Boyd Smith, Portobello, Midlothian, and Donald Murdo McCallum and Michael Arthur Vivian Matthews, Edinburgh, Scotland, assignors to Ferranti, Limited, Hollinwood, Lancashire, England, a company of Great Britain and Northern Ireland
Filed Apr. 9, 1959, Ser. No. 805,339
Claims priority, application Great Britain, Apr. 10, 1958, 11,474/58
6 Claims. (Cl. 343—11)

This invention relates to aircraft flight-control apparatus and specifically to low-flying aids. The invention has particular but not exclusive application to profile flying, by which is meant flying such a course in elevation as to follow the profile of the ground, rising over hills and dipping into valleys, and keeping generally at the same height above the ground directly beneath.

In all low-flying it is natural for the pilot to want to see the ground itself, in preference to the display of any flight-control aid, whenever possible. It is therefore desirable for all low-flying aids to present their displays in the head-up form, so that the ground itself and the display may be seen simultaneously. It is moreover highly desirable to present the pilot with a display which he can interpret in the minimum time and with the minimum distraction of his attention from observation of the ground itself.

An object of the present invention is to provide a low-flying flight-control aid for aircraft which presents its elevational information to the observer in the form of a head-up display which is easily and rapidly interpreted.

A further object is to provide such an aid in which the display is to some extent a facsimile in perspective of the undulations of the ground ahead.

In accordance with the present invention, flight-control apparatus for providing an observer in an aircraft with a head-up display at infinity to aid low flying includes radar ranging equipment for providing in respect of each of a plurality of directions in elevation to the ground ahead of the craft relative to a datum direction in the craft a response dependent on the range to the ground in that direction, display equipment for producing from said responses in respect of each of said directions an image of a straight line of length inversely proportional to the range to the ground in that direction, the lines appearing parallel to one another and spaced apart in dependence on the respective directions, and means for simultaneously displaying all said lines, so as to be normal to the plane of elevation with the shortest line uppermost, as a head-up display at infinity in register with the observer's view of the ground ahead of the craft, the arrangement being such that said display indicates the undulations of the ground with which it is seen in registration. The term "head-up display at infinity" as used herein is a phrase commonly applied by the British Royal Air Force to an aircraft instrument which provides a display of such a character and in such a position that it may be observed by the pilot without turning his eyes appreciably from the line of flight of the aircraft and while his eyes are focussed at infinity, i.e., on the ground ahead of the aircraft, as distinguished from a panel-mounted instrument which he can observe only by looking downwards into the cockpit and bringing his eyes to a close focus.

In the accompanying drawings,

FIGURE 1 is a schematic diagram of a part of flight-control apparatus in accordance with one embodiment of the invention, FIGURE 2 shows in simplified side elevation the remaining apparatus of the embodiment of FIGURE 1, FIGURE 3 shows a typical display produced by the apparatus of FIGURES 1 and 2, FIGURE 4 is a schematic diagram of another embodiment, and FIGURE 5 shows a typical display produced by the apparatus of FIGURE 4.

In carrying out the invention in accordance with one form by way of example, flight-control apparatus for providing a pilot of an aircraft with a head-up display at infinity to aid low flying includes radar ranging equipment, which may for example be of the type known as monopulse, arranged to scan repetitively in elevation the ground ahead of the aircraft and derive during each scan successive range signals representative of the ranges to the ground ahead of the craft at predetermined directions in elevation from a datum direction in the aircraft.

The equipment includes for this purpose a directional aerial system 11 which directs to the ground ahead of the craft a beam transmission 12. Under the control of a scanning actuator 13 the aerial system scans the ground ahead repetitively over the angular range $\phi_2$ to $\phi_1$ in elevation from a datum direction 14 in the craft. The aerial is fed with pulsed interrogation signals from a radar transmitter 15 and the reflected response signals are applied by the aerial to a radar receiver 16. Radar stages 15 and 16 may be considered in combination as a range-signal generator for deriving range signals each of which is constituted by a pulse transmited from stage 15 and the corresponding reflected pulse received by stage 16. Each such signal is dependent on the time interval between the instants of transmission and reception of the two pulses respectively and hence on the range to the ground in the direction then occupied by the radar beam.

The pulses from receiver 16 are applied to a reciprocal-signal generator in the form of a reciprocal computer 17. This includes a gating stage or gate 18, to which the pulses are applied as one of the inputs. Another input to the gate is a reference potential, derived conveniently from an energized potentiometer 19. A third input to the gate is derived from a Miller run-down circuit, which also forms part of the computer. The Miller circuit includes a pentode valve 21 with an anode load 22 and the usual feedback capacitor 23 between anode and control grid. The voltage bias V for this grid is derived from a range servo 24, also part of the computer, and applied to the grid by way of a resistor 25. The anode of the valve is connected to gate 18, the output from which is applied to servo 24. The particular form of this gate, which may be of known kind, will be apparent from the ensuing description of its operation. The operation of the Miller circuit is controlled by potentials on the suppressor grid of the valve, applied by the transmitter 15. In accordance with the usual action of a Miller circuit the rate of run-down of the anode voltage of valve 21 on the removal of an inhibiting bias from its suppressor grid is proportional to the valve of the bias voltage on the control grid—in this case the voltage V, as determined by the range servo 24.

The voltage V is also applied through an amplifier 26 to a modulator 27 so as to control the amplitude of an alternating voltage derived from a source 31. The voltage thus modulated is applied in push-pull to the X plates of a cathode-ray (CR) tube 32 having the usual deflection system for producing scans in the X and Y planes.

To supply the deflecting voltage for the Y plates an elevation-signal generator is provided in the form of a pick-off 33 coupled to the scan actuator 13. The pick-off includes an energised potentiometer 34 connected at tappings to the fixed contacts of a rotary selector switch 35 the wiper 36 of which is coupled to the aerial so as to traverse the fixed contacts in synchronism with each scan of the aerial. The potentials of the respective fixed contacts, as derived from potentiometer 34, may thus be considered as elevation signals each of which is dependent on a predetermined direction in elevation of the scanning beam, this direction being that of the beam 12 when the angular position of the aerial is such that wiper 36 engages the fixed contact concerned. The fixed contacts are made of appreciable length in the circumferential direction so that the wiper engages each of them for a finite time during each scan.

These elevation signals as derived by wiper 36 are applied by way of an amplifier 37 as deflection voltages to the Y plates of the CR tube.

The display on the screen of the CR tube is projected by a collimating lens system, represented at 41, see FIG. 2, onto transmitting reflector 42 located in the line of vision of the pilot to the ground ahead, thereby providing him with a head-up image of the tube display. The sense of the image is such that as the elevation angle $\phi$ of the beam (with respect to the datum direction 14) decreases, the image of the CR tube trace, as seen by the pilot, moves upwards.

In the quiescent condition of the apparatus—that is, in between the transmission/reception cycles about to be described—the valve 21 is cut off by a negative potential applied to its suppressor grid by transmitter 15.

In operation, the scanning actuator 13 causes the aerial system to scan repetitively in elevation the ground ahead of the craft. During each forward scan—that is, each scan with $\phi$ decreasing from $\phi_2$ to $\phi_1$—pulses are transmitted to the ground by transmitter 15 and corresponding reflected or echo pulses are received by receiver 16. At the end of each forward scan the aerial is rapidly transferred from the $\phi_1$ to the $\phi_2$ positions in a flyback manner. Each transmission/reception cycle is as follows.

Synchronously with the transmission of a pulse, transmitter 15 removes the inhibiting negative pulse from the suppression grid of valve 21. This initiates a run-down of the anode voltage of the valve at a rate determined by the value of the V and hence by the particular setting at the moment of the range servo 24. The received reflected pulse is applied to the gate 18. The arrangement of the gate is such that if at the instant of arrival of the pulse from receiver 16 the anode potential of the Miller valve has run-down to a value equal to the reference potential derived from potentiometer 19 there is no output from the gate to servo 24, and the value of V remains unadjusted by the servo. If however at that instant of arrival of the reflected pulse the anode potential is above that of the reference potential an error signal is delivered by the gate to servo 24 of the sense to cause the servo to increase the value of V, thereby increasing the rate of run-down of the Miller valve. At the next cycle the anode potential will accordingly be more nearly equal to the reference potential and a further but reduced error signal is applied to servo 24 to adjust V again in the same sense as before. After a few cycles the run-down rate is such as to bring the anode potential to equality with the reference potential by the time the echo pulse has arrived. The repetition rate of these cycles is rapid enough for V to be thus brought to the correct value during an angular movement of the aerial of inappreciable extent.

In between each cycle, transmitter 15 restores the inhibiting pulse to the valve to cut it off, ready for the next cycle and run-down.

The operation is similar when on the instant of reception of the echo pulse at the gate the Miller valve anode potential is below the reference potential. The run-down rate is now too fast and the error signal applied to servo 24 operates to decrease V and hence the run-down rate.

The value of V is thus maintained proportional to the reciprocal of each range signal as represented by the time elapsing between the transmission of a pulse and the receipt of the resulting echo pulse. This will readily be appreciated from the fact that the less is the range, the shorter is the time available for the run-down; hence the greater must be the speed of run-down and the value of V which determines it. Hence as the range decreases V increases reciprocally, and vice versa.

The amplitude of the voltage scan applied by modulator 27 to the X plates, being proportional to the reciprocal signal V, is thus inversely proportional to the measured range. Hence for each range, as measured by the radar equipment, there is traced on the screen of the CR tube a straight line normal to the Y scan planes and having a length inversely proportional to that range. The X scan is adjusted so that the array of lines is symmetrical with respect to the Y axis—that is to say, the centre of each line lies on the centre line of the screen in the Y direction. The position of the line in the Y direction is determined by the voltage of the Y plates, which in turn is determined by which of the fixed contacts of pick-off 35 is engaged by wiper 36.

During each scan, therefore, the pick-off delivers to the Y plates sequential elevation signals at predetermined spaced intervals determined by the positions of the tappings on potentiometer 34, these signals representing sequential angular positions of the scanning aerial and hence predetermined directions in elevation of the radar beam. Whilst wiper 36 traverses each fixed contact the Y scan voltage remains steady at the value of the tapping concerned and during this time the X scan builds up a visible line of length inversely proporitonal to the range in the direction appropriate to the then angular position of the radar beam, the repetition rate of the radar scan being sufficient for the lines to be always visible, either by persistence of vision or because of the afterglow characteristic of the screen phosphor.

There is thus displayed on the screen an array of parallel straight lines of diminishing length centred on the mid Y plane. There is one such line in respect of each range signal derived during a radar scan, the line having a length inversely proportional to that range and being located in a direction normal to itself in dependence on the elevation signal corresponding to that range. The predetermined directions of the radar scan are chosen such that the lines appear to be equally spaced apart. The lens system projects the image of this display into the pilot's line of sight so that the lines are normal to the plane of elevation with the shortest line uppermost. As depicted in FIG. 3, therefore, the pilot sees the ground itself with the lines 51 superimposed over it.

Line A represents the range at the maximum angle of scan $\phi_2$ from the datum direction; the line is therefore longer than line B, which represents the range in the next predetermined direction, because the range represented by line A is shorter than that represented by line B, and so on.

It will be realised from the above description that where the ground ahead curves downwards, as at 52, the lengths of the range lines shorten more rapidly, whereas when the ground ahead curves upwards, as at 53, the lines shorten less rapidly.

The scale factor of the CR tube representation is chosen such that each line 51 of the projected display lies over the actual terrain at the range corresponding to that line.

The projected display as seen by the pilot has thus the semblance of an "avenue" stretching ahead of the aircraft and giving an approximate facsimile in perspective of the undulation of the ground ahead, this display being at infinity and being in actual registration with the pilot's view of that portion of the ground itself, which remains clearly visible to the pilot between the lines of the display.

The vertical position of the projected display of the array as a whole, as seen by the pilot, is indicative of the direction of the airframe and hence of the direction of flight—the higher the array the lower the direction of the aircraft's flight. The upward limit of the array to ensure sufficient clearance of rising ground for a given maximum rate of upwards turn—say $3g$—may therefore be indicated on the tube screen, as a warning, by upward markers in the form of curved lines 54 bearing a fixed relationship to the computed line of flight, depicting as it were the sides of an upward-trending avenue. By so controlling the aircraft in elevation as to keep the lines of the array within these markers the pilot maintains a height which is safe for the condition of the ground ahead.

To prevent the desired height from being exceeded where the ground ahead falls, a pair of downward markers 55 may be added. These take the form of another pair of curved lines, also bearing a fixed relationship to the computed line of flight, lying within the upward markers 54 and depicting the sides of a downward-trending avenue for a maximum downward turn of $g/2$. Ranges may be indicated, as shown, along this pair of downward markers so that provided the pilot keeps the display within the markers at all ranges up to some limiting range, he maintains his clearance at the required value up to that range during a $g/2$ downward turn. This range he may vary from time to time according to his judgment of the heights and separation of the hills ahead.

The flight-control apparatus in accordance with the invention therefore provides a low-flying aid, particularly suitable for profile flying, which gives the pilot a head-up display that, being largely in fascimile form, requires the minimum of interpretation and does not distract his attention from the concentrated viewing of the ground ahead of the aircraft necessary in profile flying.

The effective aerial scan, as described above, is assumed to take place in the outward direction only—that is, from the angle $\phi_2$ to $\phi_1$, the end of each scan at the angle $\phi_1$ being followed by a flyback of the aerial to the $\phi_2$ position. Alternatively the effective scan may take place in the other direction—from $\phi_1$ to $\phi_2$—or even in both directions.

In an alternative embodiment of the invention the generator which derives its signals at predetermined spaced values is the reciprocal-signal generator 17, rather than the elevation signal generator 33 as described above. Such an alternative arrangement will now be described with reference to FIG. 4 in which the components that correspond to components of the FIG. 1 embodiment are given the same reference numbers as before.

In this arrangement the aerial system 11 is scanned in elevation by actuator 13 whilst pulses are transmitted under the control of radar transmitter 15 and received by radar receiver 16 as before. Similarly the reciprocal computer 17 derives a voltage V inversely proportional to each range as measured during a transmission/reception cycle, and this voltage is applied through amplifier 26 to modulator 27 to control the amplitude of the voltage applied from source 31 to the X plates of the CR tube 32. The apparatus for projecting the screen image in the form of a head-up display is the same as described above with reference to FIG. 2.

The present arrangement differs from that of FIG. 1 as follows.

The pick-off 61 controlled by actuator 13 is an energised potentiometer tapped closely enough for the Y scan to follow smoothly the scan of the aerial. Wiper 62 of this pick-off is connected to the Y plates of the tube by way of amplifier 37.

In addition to being applied to amplifier 26, the voltage V is applied to some sort of voltage-level discriminator 63 which may be considered as forming part of the computer. This discriminator comprises for each of predetermined equally-spaced ranges a device 64, such as a blocking oscillator, designed to respond to the value of V appropriate to that range. In responding, the device emits a pulse to open a gate 65 between modulator 27 and the X plates of the CR tube, thereby allowing the range trace corresponding to that range to appear on the screen. Alternatively, the gate 65 may be dispensed with and the pulses from discriminator 63 applied to brighten the trace, otherwise invisible.

In operation, therefore, a range trace appears on the screen each time the measured range equals one of the predetermined values as represented by one of the devices 64. The level of the trace on the screen is determined by the direction in elevation of the beam at that range, as determined by the potential of wiper 62 of the pick-off. The projected display—see FIG. 5—is thus of an array of lines of fixed length but of varying levels. Where the ground ahead curves downwards, as at 71, and in consequence the successive directions of the measured ranges becomes less, the range lines crowd together; whereas the ground curves upwards, as at 72, the lines become more separate. The projected display has thus again the semblance of an avenue giving an approximate facsimile in perspective of the undulations of the ground ahead, again without appreciably impeding the pilot's view of the ground.

The vertical position of the projected display is again indicative of the direction of the airframe and fixed upward and downward markers 54 and 55 may again be added to the display.

In a modified form of this embodiment the range signals may be applied to a discriminator, adjusted to respond to predetermined values of the range, before being applied to the reciprocal computer. In this case the gate 65 may be controlled directly by the reciprocal signal V, which is now only developed in respect of each predetermined range. In this arrangement, therefore, it is the range-signal generator which derives its signals at predetermined values.

What we claim is:

1. Flight-control apparatus for providing an observer in an aircraft with a head-up display at infinity to aid low-flying comprising radar means for producing in respect of each of a plurality of directions in elevation to the ground ahead of the aircraft relative to a datum direction in the aircraft a signal representative of the range to the ground in that direction, means responsive to said signals for producing images of a plurality of parallel straight lines equal in number to said directions, the order of and spacing between said lines corresponding to the order of and angular spacing between said directions and each line having a length inversely proportional to the range to the ground in the corresponding direction, and means for producing a head-up display at infinity of all of said lines simultaneously, with the lines normal to the plane of elevation in which said directions lie and with the shortest line uppermost, in register with the observer's view of the ground ahead of the craft, whereby said display indicates the undulations of the ground with which it is seen in registration.

2. Flight-control apparatus for providing an observer in an aircraft with a head-up display at infinity to aid low-flying comprising radar ranging means for scanning repetitively in elevation the ground ahead of the aircraft including three generators, namely, (a) an elevation-signal generator for producing during each radar scan a plurality of successive elevation signals each corresponding to a different direction in elevation to the ground relative to a datum direction in the aircraft, (b) a range-signal generator for producing in respect of each of said directions a range signal corresponding to the range to the ground in that direction, and (c) a reciprocal-signal generator for producing in respect of each range signal a reciprocal signal inversely proportional to that range, one of said three generators being so constructed and arranged as to produce its signals only at predetermined spaced values thereof, said radar ranging means also including a cathode-ray tube having a screen and X and Y deflection electrodes for scanning the screen of the tube in planes at right angles to one another, connections for applying the reciprocal signals to the X electrodes of the tube and the elevation signals to the Y electrodes, whereby there is displayed on the screen of the tube a plurality of parallel straight lines located on the screen symmetrically with respect to the Y axis, said lines corresponding in number to the number of range signals produced during a radar scan, each line having a length inversely proportional to the corresponding range and being located in a position along the Y axis in dependence on the elevation signal corresponding to that range, and an optical system for superimposing on the observer's view of the ground ahead of the craft an optical image at infinity of the display on said screen with the lines horizontal and the shortest line uppermost, which image thereby forms an approximate facsimile in perspective of the undulations of the ground so viewed.

3. Apparatus as claimed in claim 2 wherein the range-signal generator includes means for producing signals each of which is in the form of two pulses defining respectively the instant of transmission of a radar pulse and the instant of reception of the corresponding reflected pulse, and said reciprocal-signal generator includes a Miller rundown valve circuit having servo means for adjusting a controlling voltage of the circuit until the duration of each run-down between predetermined potential levels is equal to the time interval between said pulses, whereupon said control voltage is applied to the X electrodes of the tube as the reciprocal signal.

4. Apparatus as claimed in claim 2 wherein the elevation-signal generator is so constructed and arranged as to produce its signals at predetermined spaced values of elevation and which includes a potentiometer tapped at intervals to represent the predetermined values of elevations, means for energizing the potentiometer, a wiper for traversing the tappings of said potentiometer, means for traversing the wiper in synchronism with the radar scan, and connections from the wiper to the Y electrodes of the tube.

5. Apparatus as claimed in claim 2 wherein the reciprocal-signal generator is so constructed and arranged as to produce its signals at predetermined spaced values of reciprocal range and which includes a voltage-level discriminator for receiving the reciprocal-signal and emitting a control pulse only when that signal has one of a plurality of predetermined values, and means responsive to the emitted control pulse for causing the X scans of the tube to be visible only during the incidence of said control pulses.

6. Apparatus as claimed in claim 2 wherein the display on the tube screen includes marker lines for indicating the limiting vertical positions of said straight lines consistent with the maintenance of a desired height of flight without exceeding predetermined limits of upward and downward rates of turn of the aircraft.

References Cited by the Examiner
UNITED STATES PATENTS
2,416,591   2/47   Muntz _____ 343—11

CHESTER L. JUSTUS, *Primary Examiner.*
FREDERICK M. STRADER, *Examiner.*